United States Patent
Cook et al.

(10) Patent No.: US 9,650,154 B2
(45) Date of Patent: May 16, 2017

(54) AIRCRAFT LANDING GEAR ASSEMBLIES WITH NON-ROTATING LIGHT ELEMENT CLUSTERS

(71) Applicant: Gulfstream Aerospace Corporation, Savannah, GA (US)

(72) Inventors: Brian Cook, Savannah, GA (US); Michael Knight, Savannah, GA (US); John Louis, Savannah, GA (US); Thomas Van de Ven, Savannah, GA (US); Robert M. Vieito, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 91 days.

(21) Appl. No.: 14/562,100

(22) Filed: Dec. 5, 2014

(65) Prior Publication Data

US 2016/0159495 A1 Jun. 9, 2016

(51) Int. Cl.
*B64D 47/02* (2006.01)
*B64D 47/04* (2006.01)
*B64C 25/00* (2006.01)
*B64C 25/50* (2006.01)
*B64C 25/10* (2006.01)

(52) U.S. Cl.
CPC ............ *B64D 47/02* (2013.01); *B64C 25/001* (2013.01); *B64C 25/10* (2013.01); *B64C 25/50* (2013.01); *B64D 47/04* (2013.01); *B64C 2025/003* (2013.01)

(58) Field of Classification Search
CPC ......... B64C 25/34; B64C 25/50; B64C 25/16; B64C 25/00; B64C 25/10; B64C 2025/345; B64C 2025/003; B64C 2025/125; B64C 21/00; B64C 2230/14; B64D 47/04; B64D 47/02; B64D 47/06
USPC ..... 244/1 N, 100 R, 102 R, 102 A; 340/981, 340/982
See application file for complete search history.

(56) References Cited

U.S. PATENT DOCUMENTS

| | | | | |
|---|---|---|---|---|
| 2,420,066 A * | 5/1947 | Conway | | B64C 25/28 200/314 |
| 2,443,007 A * | 6/1948 | Kennedy | | B64D 47/04 248/324 |
| 3,436,729 A * | 4/1969 | Zurcher | | B64D 47/06 340/981 |
| 3,706,968 A * | 12/1972 | Turner, Jr. | | B64D 47/06 340/815.67 |
| 4,233,652 A * | 11/1980 | Oswald | | B64D 47/02 315/83 |
| 6,507,290 B1 * | 1/2003 | Lodhie | | B64D 47/06 244/1 R |

(Continued)

OTHER PUBLICATIONS

Utility U.S. Appl. No. 14/201,345, filed Mar. 7, 2014.
Utility U.S. Appl. No. 14/623,972, filed Feb. 17, 2015.

*Primary Examiner* — Benjamin P Lee
(74) *Attorney, Agent, or Firm* — LKGlobal | Lorenz & Kopf, LLP

(57) ABSTRACT

Aircraft landing gear assemblies and aircraft are provided. A landing gear assembly includes a main post and a light element cluster. The main post has a non-rotating portion and a rotatable steering portion. The light element cluster is associated with the non-rotating portion and includes at least two independently illuminating sections.

16 Claims, 2 Drawing Sheets

(56) References Cited

U.S. PATENT DOCUMENTS

| | | | | |
|---|---|---|---|---|
| 7,458,542 B2* | 12/2008 | Chow | ................... | B64C 7/00 244/102 R |
| 8,162,255 B2* | 4/2012 | Weaver | ................... | B64C 25/16 244/102 R |
| 8,192,060 B2* | 6/2012 | Wilkinson | ................... | B64D 47/06 340/815.45 |
| 8,302,906 B2* | 11/2012 | Chow | ................... | B64C 7/00 244/102 A |
| 8,490,914 B2* | 7/2013 | Chow | ................... | B64C 7/00 244/1 N |
| 8,662,721 B2* | 3/2014 | Calvin | ................... | B64D 47/06 362/331 |
| 2003/0029966 A1* | 2/2003 | Derrien | ................... | B64C 25/10 244/102 R |
| 2003/0102406 A1* | 6/2003 | Chow | ................... | B64C 7/00 244/100 R |
| 2003/0164423 A1* | 9/2003 | Courtois | ................... | B64C 7/00 244/102 R |
| 2004/0059497 A1* | 3/2004 | Sankrithi | ................... | B64C 25/50 701/120 |
| 2006/0255555 A1* | 11/2006 | Lindahl | ................... | B64C 25/50 280/92 |
| 2008/0142634 A1* | 6/2008 | Moe | ................... | B64C 7/00 244/1 N |
| 2009/0078821 A1* | 3/2009 | Chow | ................... | B64C 7/00 244/1 N |
| 2010/0084509 A1* | 4/2010 | Weaver | ................... | B64C 25/16 244/102 R |
| 2012/0268959 A1* | 10/2012 | Barnett | ................... | B64D 47/04 362/470 |
| 2013/0077332 A1* | 3/2013 | Hessling | ................... | B64D 47/06 362/470 |
| 2015/0166196 A1* | 6/2015 | Wilson | ................... | B64C 25/50 244/104 FP |

* cited by examiner

AIRCRAFT LANDING GEAR ASSEMBLIES WITH NON-ROTATING LIGHT ELEMENT CLUSTERS

TECHNICAL FIELD

The technical field relates generally to aircraft landing gear assemblies with lamp fairings and light element clusters, and more particularly relates to aircraft landing gear assemblies with non-rotating light emitting diode clusters.

BACKGROUND

Jet airplanes commonly fly over populated areas. Some portions of these flights are at low altitude, such as during takeoff, landing, and flyovers. Noise from these low altitude operations of jet airplanes may be objectionable to some residents of such populated areas. Noise from jet airplanes is commonly associated with the jet engines of the aircraft. Modern advances in aircraft, however, have significantly reduced the noise of jet engines.

Noise is also generated by other components interacting with the atmosphere, such as flaps and landing gear. A traditional landing gear assembly includes an array of parabolic headlamps that are fixed for common rotation with the front wheel of the landing gear. Such common rotation is provided to illuminate the direction in which the aircraft will be directed by the front wheel. These parabolic headlamps often have bulky shapes that generate airframe noise during takeoffs, landings, and flyovers. Furthermore, the need for electrical connections that accommodate rotation of the headlamps increases the complexity of the landing gear assemblies.

As such, it is desirable to provide lighting assemblies for aircraft with reduced complexity and less airframe noise than conventional parabolic headlamps on landing gear assemblies. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of landing gear assemblies and aircraft are disclosed herein.

In a first non-limiting embodiment, a landing gear assembly for an aircraft includes, but is not limited to, a main post and a light element cluster. The main post has a non-rotating portion and a rotatable steering portion. The light element cluster is associated with the non-rotating portion and includes at least two independently illuminating sections.

In a second non-limiting embodiment, an aircraft includes, but is not limited to, a fuselage, a landing gear assembly, and a light element cluster. The fuselage defines a landing gear bay and the landing gear assembly is at least partially disposed in the landing gear bay. The landing gear assembly includes a tiller and a main post. The main post has a non-rotating portion and a rotatable steering portion. The rotatable steering portion is coupled with the tiller and is configured to rotate with the tiller. The light element cluster is fixed for common rotation with the fuselage and is configured to illuminate based on a steering angle of the tiller.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of landing gear assemblies and aircraft are disclosed herein. The embodiments include various configurations of a non-rotating light assembly with a lamp fairing and a light element cluster. The lamp fairing is aerodynamically shaped to minimize aerodynamic noise and drag. The light element cluster is configured to illuminate based on a steering angle of a tiller. A greater understanding of the aircraft and landing gear assemblies may be obtained through a review of the illustrations accompanying this application together with a review of the detailed description that follows.

Figure 1:
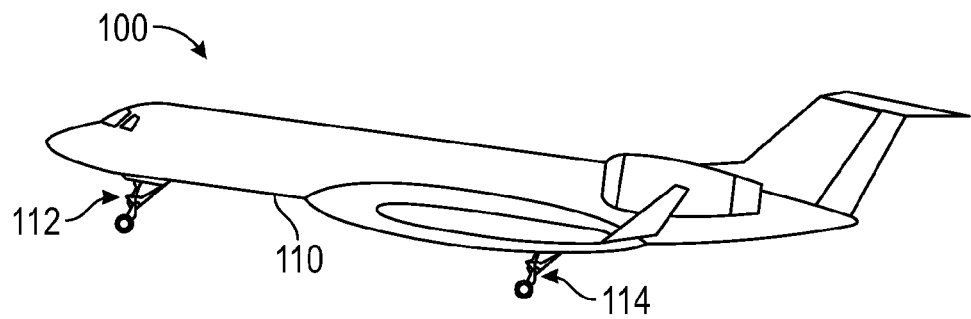
FIG. 1 is a side view illustrating a non-limiting embodiment of an aircraft in accordance with the teachings of the present disclosure.

Referring now to FIG. 1, an aircraft 100 is illustrated in side view in accordance with the teachings of the present disclosure. Aircraft 100 includes a fuselage 110, a nose wheel landing gear assembly 112, and main landing gear assemblies 114. In the example provided, aircraft 100 is a jet airplane. In other embodiments, aircraft 100 may be other airborne vehicles, such as helicopters, propeller operated planes, or air ships without departing from the scope of the present disclosure. Fuselage 110 includes an outer skin and a frame structure to which the outer skin is secured.

Figure 2:
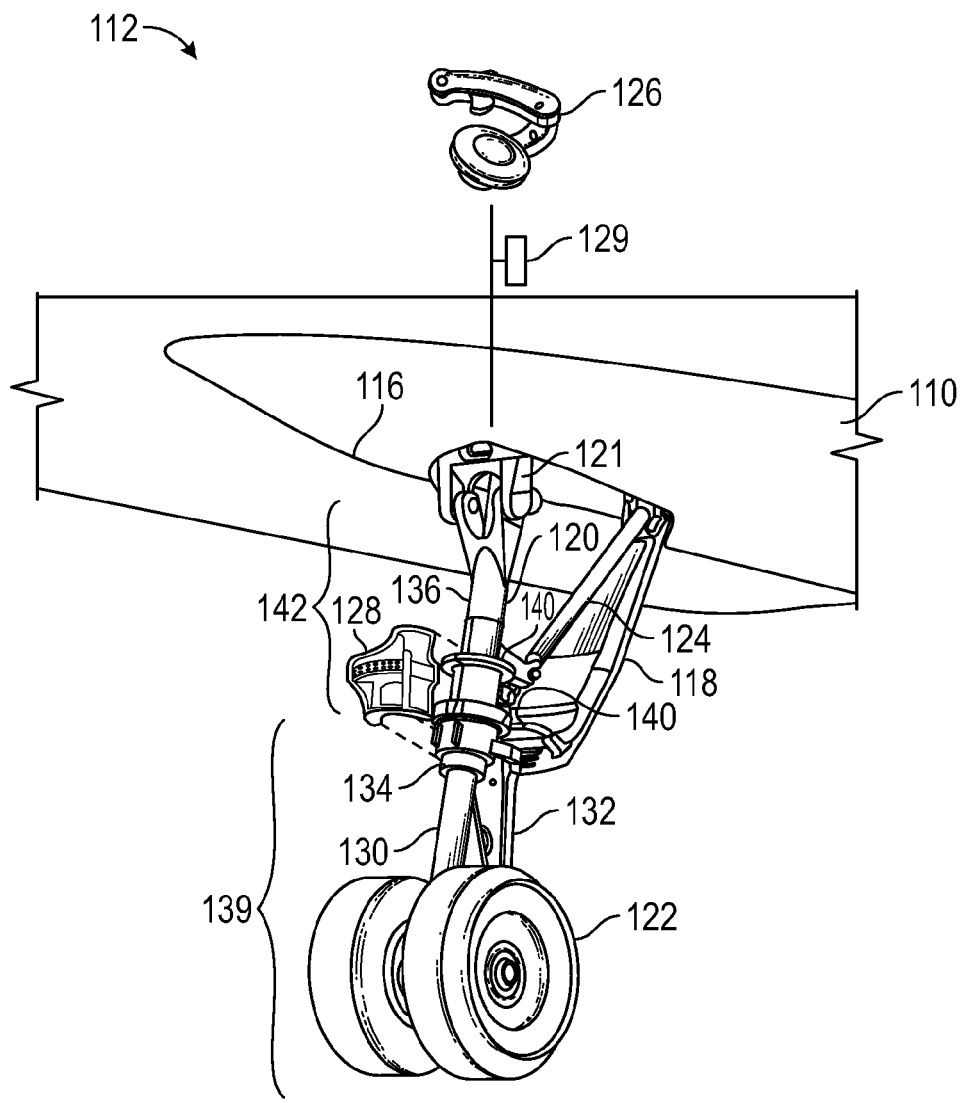
FIG. 2 is a perspective view illustrating a non-limiting embodiment of the landing gear assembly of FIG. 1 in accordance with the teachings of the present disclosure.

Referring now to FIG. 2, nose wheel landing gear assembly 112 and a portion of aircraft 100 is illustrated in greater detail in accordance with the teachings of the present disclosure. Fuselage 110 includes a landing gear bay 116 into which components of nose wheel landing gear assembly 112 may be folded, as will be appreciated by those with ordinary skill in the art. A door 118 closes to be flush with the fuselage skin of fuselage 110 and seal landing gear bay 116 when nose wheel landing gear assembly 112 is retracted.

Nose wheel landing gear assembly 112 includes a main post 120, a truss brace 121, nose wheels 122, drag links 124, a tiller 126, a light assembly 128, and a controller 129. It should be appreciated that additional, alternative, or fewer components may be utilized with light assembly 128 without departing from the teachings of the present disclosure. Main post 120 includes an oleo strut 130, torque links 132, a steering collar 134, and a non-rotating member 136.

Oleo strut 130 is a shock absorber assembly that is rotationally fixed to nose wheels 122. Oleo strut 130 is received in, and is freely rotatable with respect to, steering collar 134. Torque links 132 are secured to steering collar 134 and nose wheels 122 to transfer steering torque from steering collar 134 to nose wheels 122 during ground operations of aircraft 100.

Steering collar 134 is rotatable by tiller 126. For example, rotating tiller 126 causes rotation of steering collar 134, such as by hydraulic or electric linkages, as will be appreciated by those with ordinary skill in the art. Steering collar 134, oleo strut 130, and nose wheels 122 form a steerable portion 139 of main post 120. As will be appreciated by those with ordinary skill in the art, traditional light clusters are typically mounted to similar steerable portions so that the light cluster illuminates objects in the direction the wheels are oriented.

Non-rotating member 136 is coupled with drag links 124 and truss brace 121 to extend out of and retract into landing gear bay 116, as will be appreciated by those with ordinary skill in the art. As used herein, "non-rotating" with reference to member 136 refers to the fixed rotational angle of non-rotating member 136 about a longitudinal axis of non-rotating member 136. For example, a portion of non-rotating member 136 that faces starboard will not rotate to face port during normal operation of non-rotating member 136. In the example provided, non-rotating member 136 has a cylindrical shape with at least one flange 140 formed at an end adjacent to steering collar 134. Non-rotating member 136 forms a non-rotating portion 142 of main post 120. It should be appreciated that additional components may be utilized in non-rotating portion 142 without departing from the scope of the present disclosure.

Nose wheels 122 are mounted for free rotation with oleo strut 130 to steer aircraft 100 during ground operations of aircraft 100. Drag links 124 are connected between fuselage 110 and non-rotating portion 142 of main post 120. Nose wheels 122 and drag links 124 may have other shapes or configurations, as will be appreciated by those with skill in the art.

Tiller 126 is located in a cockpit of aircraft 100 to provide a mechanism for pilots of aircraft 100 to steer nose wheels 122 through steering collar 134 and torque links 132. In some embodiments, tiller 126 is coupled to steering collar 134 by a hydraulic circuit that amplifies the torque provided by the pilot on tiller 126 to a larger torque on steering collar 134. In some embodiments, the steering angle of tiller 126 may be detected by a sensor and an electric motor may transmit the steering commands to steering collar 134.

Figure 3A:
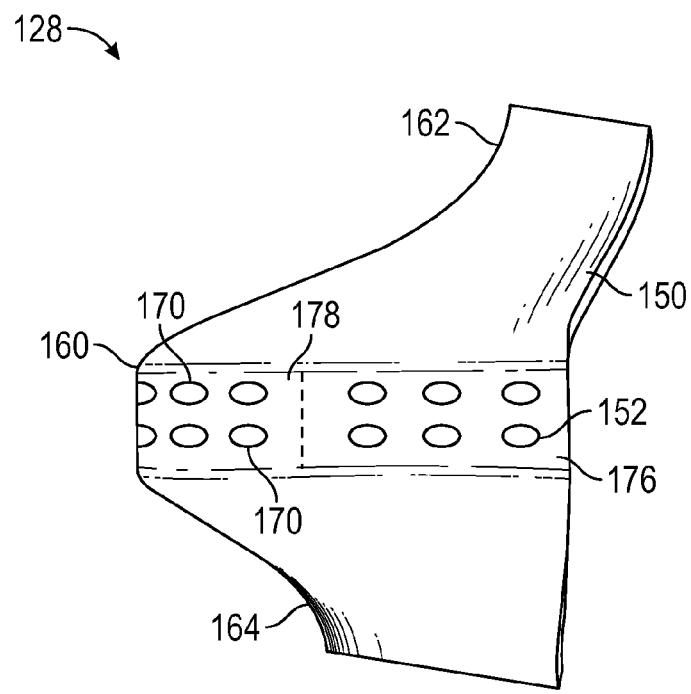
FIGS. 3A and 3B are views illustrating a non-limiting embodiment of the light assembly of FIG. 2 in accordance with the teachings of the present disclosure.
Figure 3B:
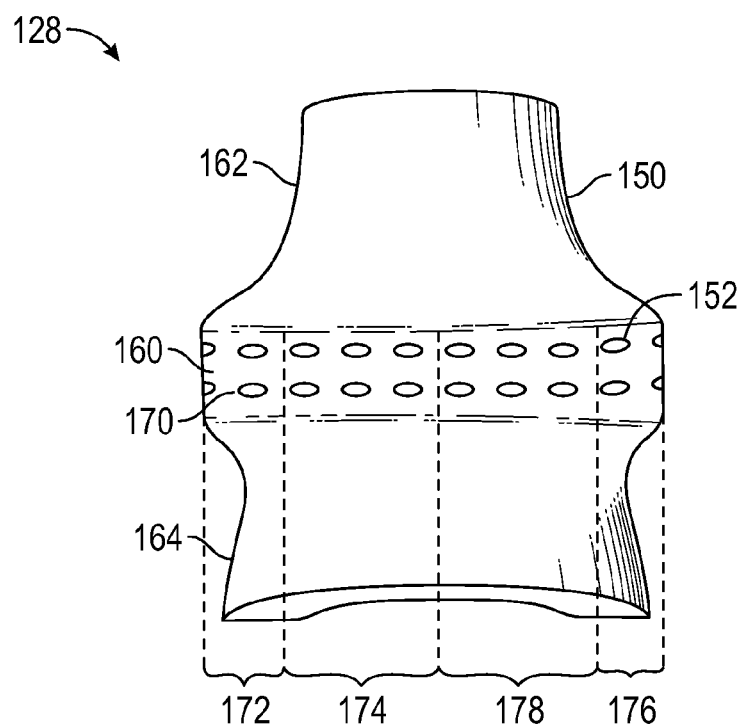

With reference to FIG. 3A and FIG. 3B, and with continuing reference to FIG. 2, light assembly 128 is illustrated in side and front views in accordance with the teachings of the present disclosure. Light assembly 128 includes a lamp fairing 150 and a light element cluster 152. In some embodiments, lamp fairing 150 is formed from molded plastic. In some embodiments, lamp fairing 150 is formed from metallic or composite materials. Lamp fairing 150 includes a semi-cylindrical portion 160, an upper concave portion 162, and a lower concave portion 164 that are configured to minimize noise and aerodynamic drag when landing gear assembly 112 is extended.

Semi-cylindrical portion 160 is shaped substantially as a smooth cylindrical shell between upper and lower concave portions 162 and 164. Semi-cylindrical portion 160 acts as a mounting portion for light element cluster 152, as will be described below. In the example provided, semi-cylindrical portion 160 has a substantially constant diameter. In some embodiments, semi-cylindrical portion 160 may have a tapered shape similar to a semi-cone with a first diameter at an interface with upper concave portion 162 and a second diameter that is smaller than the first diameter at an interface with lower concave portion 164. In some embodiments, semi-cylindrical portion 160 may be elongated in the fore-aft direction of aircraft 100.

Upper concave portion 162 has a continuously decreasing diameter as upper concave portion 162 extends away from semi-cylindrical portion 160 towards aircraft 100. In the example provided, upper concave portion mounts to flange 140 of non-rotating portion 142. Lower concave portion 164 has a continuously decreasing diameter as lower concave portion 164 extends away from semi-cylindrical portion towards nose wheels 122. In some embodiments, upper and lower concave portions 162 and 164 have different shapes, including convex shapes, without departing from the scope of the present disclosure.

Light element cluster 152 is fixed for common rotation with aircraft 100. As used herein, the term "fixed for common rotation" with aircraft 100 or the fuselage of aircraft 100 means that light element cluster 152 is disposed in a fixed position on aircraft 100, and does not rotate with nose wheels 122 or other portions of landing gear assembly 112. In the example provided, light element cluster 152 includes a plurality of light-emitting diodes (LEDs) 170 arranged in a first starboard section 172, a second starboard section 174, a first port section 176, and a second port section 178 on semi-cylindrical portion 160 of lamp fairing 150. Each of sections 172, 174, 176, and 178 is independently illuminating so that any of the sections may be illuminated without requiring illumination of any other section. First starboard section 172 is oriented to illuminate to the starboard side at least up to a starboard maximum steering angle of nose wheels 122 and first port section 176 is oriented to illuminate to the port side at least up to a port maximum steering angle of nose wheels 120. In other words, light element cluster 152 illuminates an intended steering direction even when nose wheels 122 are rotated to turn aircraft 100 at very sharp angles. In some embodiments, LEDs 170 are divided into additional port and starboard sections. In some embodiments, LEDs 170 are divided into only a single port section and a single starboard section.

In the example provided, LEDs 170 are encapsulated by a transparent material that forms an outer surface of semi-cylindrical portion 160 of lamp fairing 150. In some embodiments, LEDs 170 are encapsulated in a translucent material or are exposed without an encapsulating material. In some embodiments, alternative light generating elements are utilized.

In some embodiments, light element cluster 152 is located on other portions of aircraft 100, such as the airframe or aircraft skin. For example, light element cluster 152 may mounted on the nose portion of aircraft 100 flush with the aircraft skin, as will be appreciated by those with ordinary skill in the art. In some embodiments, sections 172, 174, 176, and 178 may be separate from each other and incorporated on different portions of aircraft 100. For example, in various combinations of embodiments section 172 or sections 172 and 174 may be incorporated in the right side of the nose of the aircraft, sections 176 or sections 176 and 178 may be incorporated in the left side of the nose, and sections 174 and 176 and/or an additional center section and/or no sections may be facing straight ahead.

Referring again to FIG. 2, controller 129 is in electronic communication with light element cluster 152 and is configured to selectively illuminate the light element cluster based on a steering angle of tiller 126. For example, sections 172, 174, 176, and 178 of light element cluster 152 may be selectively illuminated based on a steering angle of tiller 126. When tiller 126 is rotated clockwise to steer steering collar 134 and nose wheels 122 to starboard from a center position, controller 129 sequentially illuminates second starboard section 174 and then first starboard section 172 in accordance with the changing steering angle. Similarly, when tiller 126 is rotated counter-clockwise to steer steering collar 134 and nose wheels 122 to port from a center position, controller 129 sequentially illuminates second port section 178 and then first port section 176 in accordance with the changing steering angle. In embodiments with multiple separate sections, controller 129 may illuminate the separate sections in the directions corresponding with the steering angle of tiller 126.

In some embodiments, controller 129 is a mechanical switch that couples sections 172, 174, 176, and/or 178 with a power source based on the steering angle. In some embodiments, controller 129 is an electronic controller that may include any control circuitry capable of performing the various tasks described below. For example, the control circuitry may include a processor, such as a microprocessor, microcontroller, or digital signal processor (DSP), configured to execute instructions directing the processor to illuminate LEDs 170 based on the steering angle of tiller 126. In other implementations, the control circuitry may be hardware-based logic, or may include a combination of hardware, firmware, and/or software elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A landing gear assembly for an aircraft, the landing gear assembly comprising:
   a main post having a non-rotating portion and a rotatable steering portion;
   a lamp fairing rotationally fixed to the non-rotating portion;
   a tiller rotationally coupled with the rotatable steering portion of the main post; and
   a light element cluster associated with the non-rotating portion, attached to the lamp fairing and including at least two independently illuminating sections, wherein the at least two independently illuminating sections include a first starboard section configured to face a starboard side of the aircraft and a first port section configured to face a port side of the aircraft, and
   wherein the first starboard section is configured to illuminate in response to the tiller rotating to point the rotatable steering portion to the starboard side, and wherein the first port section is configured to illuminate in response to the tiller rotating to point the rotatable steering portion to the port side.

2. The landing gear assembly of claim 1, wherein the lamp fairing is configured to minimize aerodynamic noise and drag.

3. The landing gear assembly of claim 1, further comprising an encapsulating material disposed on the light element cluster across at least two independently illuminating sections to form an outer surface of the lamp fairing.

4. The landing gear assembly of claim 1, further comprising a controller operatively coupled with the light element cluster and configured to illuminate the first starboard section and the first port section in response to a steering angle of the tiller.

5. The landing gear assembly of claim 1, wherein the first starboard section of the light element cluster is oriented to illuminate to the starboard side at least up to a starboard maximum steering angle of the landing gear assembly, and wherein the first port section of the light element cluster is oriented to illuminate to the port side at least up to a port maximum steering angle of the landing gear assembly.

6. The landing gear assembly of claim 1, wherein the light element cluster further comprises a second starboard section and a second port section, and wherein the second starboard section is disposed between the first starboard section and the second port section, and the second port section is disposed between the second starboard section and the first port section.

7. The landing gear assembly of claim 1, wherein each of the at least two independently illuminating sections includes an array of light emitting diodes (LED).

8. The landing gear assembly of claim 1, wherein the light element cluster is disposed on a substantially cylindrical portion of the lamp fairing.

9. The landing gear assembly of claim 1, wherein the lamp fairing defines a first concave portion and a second concave portion, wherein the first concave portion and the second concave portion each have a continuously decreasing diameter from the substantially cylindrical portion to the non-rotating portion of the main post.

10. An aircraft, comprising:
    a fuselage defining a landing gear bay;
    a landing gear assembly at least partially disposed in the landing gear bay and comprising:
      a tiller, and
      a main post having a non-rotating portion and a rotatable steering portion, wherein the rotatable steering portion is coupled with the tiller and is configured to rotate with the tiller; and
    a light element cluster fixed for common rotation with the fuselage and configured to illuminate based on a steering angle of the tiller.

11. The aircraft of claim 10, wherein the landing gear assembly further includes a lamp fairing rotationally fixed to the non-rotating portion and configured to minimize aerodynamic noise and drag, and wherein the light element cluster is secured to the lamp fairing and includes two independently illuminating sections.

12. The aircraft of claim 11, wherein the light element cluster is disposed on a substantially cylindrical portion of the lamp fairing.

13. The aircraft of claim 12, wherein the lamp fairing defines a first concave portion and a second concave portion, wherein the first concave portion and the second concave portion each have a continuously decreasing diameter from the substantially cylindrical portion to the non-rotating portion of the main post.

14. The aircraft of claim 10, wherein the light element cluster includes at least two independently illuminating sections that include a first starboard section configured to face a starboard side of the aircraft and a first port section configured to face a port side of the aircraft.

15. The aircraft of claim 14, wherein the first starboard section is configured to illuminate in response to the tiller rotating to point the rotatable steering portion to the starboard side, and wherein the first port section is configured to illuminate in response to the tiller rotating to point the rotatable steering portion to the port side.

16. The aircraft of claim 14, further comprising a controller operatively coupled with the light element cluster and configured to illuminate the first starboard section and the first port section in response to a steering angle of the tiller.

\* \* \* \* \*